United States Patent [19]

Hishikari et al.

[11] Patent Number: 4,599,507
[45] Date of Patent: Jul. 8, 1986

[54] TEMPERATURE CONTROL SYSTEM FOR A BLACKBODY FURNACE

[75] Inventors: Isao Hishikari; Toshihiko Ide, both of Saitama, Japan

[73] Assignee: Chino Works, Ltd., Tokyo, Japan

[21] Appl. No.: 353,977

[22] Filed: Mar. 2, 1982

[30] Foreign Application Priority Data

Jul. 7, 1981 [JP] Japan .............................. 56-105839
Jul. 23, 1981 [JP] Japan .............................. 56-114455

[51] Int. Cl.$^4$ .............................................. H05B 1/02
[52] U.S. Cl. .................................... 219/486; 219/483; 219/553; 250/493.1
[58] Field of Search ............... 219/494, 352, 553, 353, 219/354, 483, 486; 250/493.1, 526, 455.1

[56] References Cited

U.S. PATENT DOCUMENTS 3,263,016  7/1966  Branstetter et al. ................. 219/553
3,699,343  10/1972  Stein et al. ......................... 250/493.1

FOREIGN PATENT DOCUMENTS 0052951  4/1980  Japan ................................. 250/493.1
0497482  3/1976  U.S.S.R. ............................. 250/493.1

Primary Examiner—M. H. Paschall
Attorney, Agent, or Firm—Sherman & Shalloway

[57] ABSTRACT

In a blackbody furnace comprises a furnace provided with at least one aperture at an end along a horizontal direction with the interior thereof being hollow and a polyhedral heating unit is provided enveloping the furnace, each surface of the aperture, target and side surfaces of the heating unit is divided into two or three zones, and these zones of the heating unit are controlled in such manner that the temperature of the aperture comes to have a prescribed relationship with respect to the temperature of the target of the blackbody furnace, whereby the effective cavity emissivity of the blackbody furnace is always unity.

3 Claims, 7 Drawing Figures

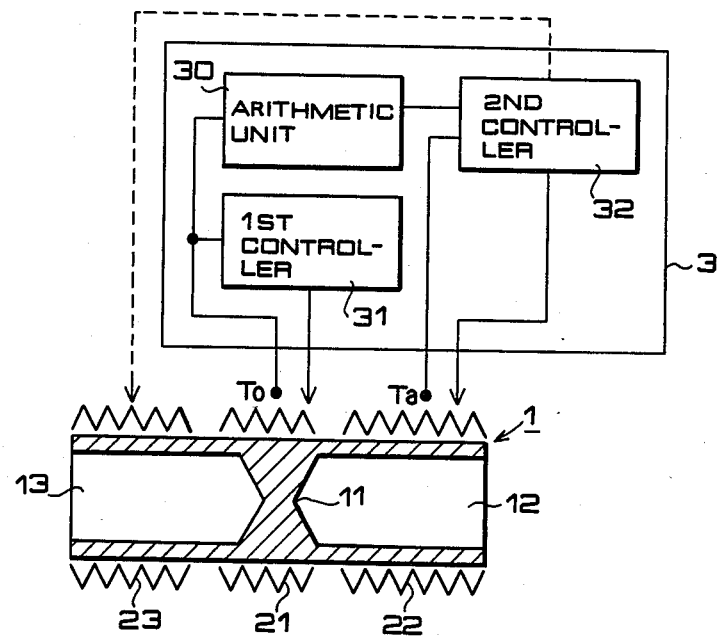
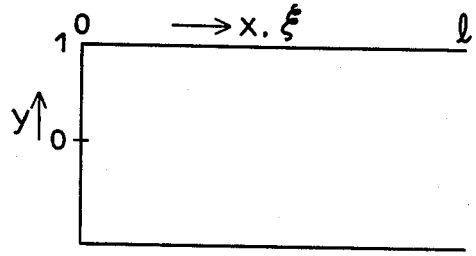
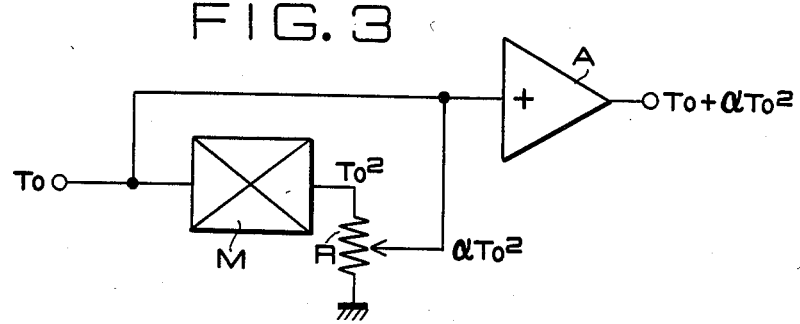

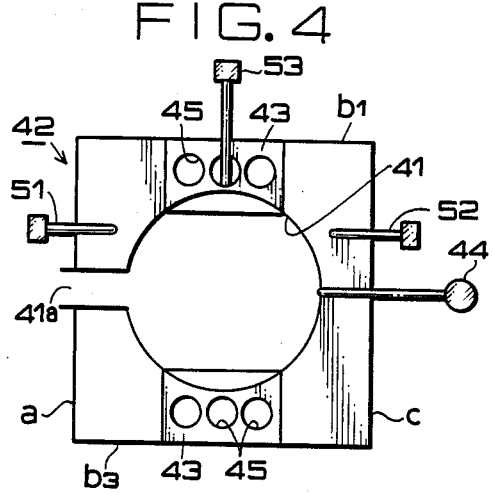
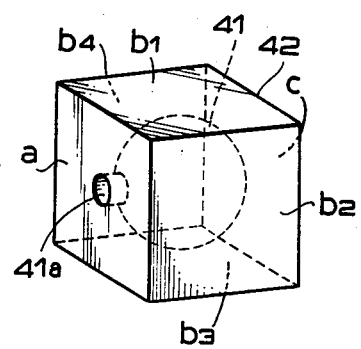
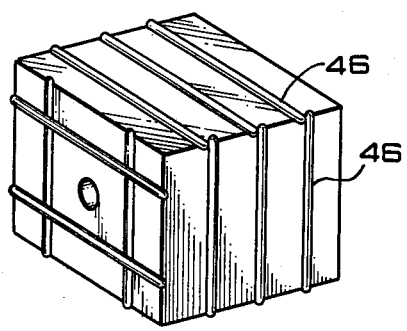
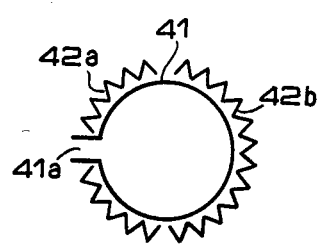

TEMPERATURE CONTROL SYSTEM FOR A BLACKBODY FURNACE

BACKGROUND OF THE INVENTION

1. Field of the Invention

This invention relates to a blackbody furnace with a favorable temperature distribution which is utilized for calibration and the like for radiation thermometers.

2. Description of the Prior Art

Heretofore, conventional blackbody furnaces having a large aperture diameter could not be a perfect blackbody having an effective cavity emissivity of unity due to the influences of the apertures, even if the inner wall of the cavity of such blackbody furnaces has a uniform temperature. For this reason, in such conventional blackbody furnaces, three-zone control means having a main heater is disposed on the targets of a cylindrical blackbody furnace as well as two auxiliary heaters which are disposed in the vicinity of opposite apertures thereof, respectively, and the temperatures of the respective auxiliary heaters are raised to correct energy emitted from the apertures. However, such amount of energy to be compensated varies dependent upon measurement temperatures or measurement wavelengths, and therefore it is difficult to always utilize such conventional cylindrical blackbody furnaces as the optimum blackbody furnaces.

Furthermore blackbody furnaces are indispensable instruments for calibrating radiation thermometers and the like, so that a blackbody furnace having a favorable temperature distribution has heretofore been required in this respect.

On one hand, a temperature generator suitable for application to spherical blackbody furnaces is proposed in Japanese Patent Application No. 62973/80. In this case, a heating member is divided into the upper, lower and side surfaces, and temperature control thereof is carried out in such conditions, but it became clear that compensation for temperature drop at the aperture surface side in such spherical blackbody furnaces was particularly difficult. In such case, even if the density of heat generation in the aperture surface side of the spherical blackbody furnaces is elevated, it is difficult to effect a well-balanced temperature control extending over the whole region of measured temperatures.

SUMMARY OF THE INVENTION

In view of the above, it is an object of the present invention to provide a blackbody furnace in which the furnace is subjected to zone division and zone control, whereby temperature of the aperture side is controlled to be higher than that of the bottom section side with a fixed relationship, so that the effective cavity emissivity of the furnace always can be maintained at unity.

BRIEF DESCRIPTION OF THE DRAWINGS

FIG. 1 is an explanatory view showing a construction of one embodiment of the present invention;

FIG. 2 is a schematic view of coordinates of a cylindrical cavity to explain the equation of mutual reflection;

FIG. 3 is a block diagram showing one example of the arithmetic unit used in the cylindrical blackbody furnace of FIG. 2;

FIG. 4 is a side explanatory view showing another embodiment of the present invention;

FIG. 5 is an explanatory view illustrating clearly a zone division of the spherical blackbody furnace according to the present invention;

FIG. 6 is a perspective view showing a heating unit around all the sides of which are provided with rod-like members; and FIG. 7 is a schematic view showing still another embodiment of the invention in which two heating members are disposed on the aperture and target sides of a spherical blackbody furnace to divide the same into two zones.

DESCRIPTION OF THE PREFERRED EMBODIMENTS

FIG. 1 is an explanatory view showing the construction of one embodiment of the present invention in which reference numeral 1 designates a cylindrical blackbody furnace provided with opposite wedge-shaped targets 11 of the blackbody furnace in the center thereof, and apertures 12 and 13 on both ends thereof, a main heater 21 disposed on the outer periphery of the targets 11, auxiliary heaters 22 and 23 disposed in the vicinity of both the apertures 12 and 13, respectively, and a first controller 31 for detecting a temperature $T_o$ of the targets and controlling the main heater 21 in such a way that the so detected temperature comes to be a prescribed temperature. A second controller 32 serves to detect a temperature $T_o$ of the main heater 21 by an output $f(T_o)$ having a prescribed relationship by means of an arithmetic unit 30 so as to control a temperature of $T_a$ of the auxiliary heater 22 by utilizing the output $f(T_o)$ as the set value, respectively. A control part 3 comprises the first and second controllers 31 and 32, and the arithmetic unit 30. Since the auxiliary heater 23 is substantially identical to the auxiliary heater 22, the explanation therefor will be merely made hereinbelow in respect of the latter auxiliary heater 22.

In such construction, the main and auxiliary heaters 21 and 23 may be controlled by means of the first and second controllers 31 and 32 in such a manner that the temperature $T_a$ of the aperture 12 maintains a prescribed relationship with respect to the temperature $T_o$ of the target 11.

The principle of the present invention is as follows.

FIG. 2 is a schematic view of coordinates of a cylindrical cavity to explain the equations of mutual reflection of a cylindrical furnace having overall length l and unit length being the radius thereof. When coordinates of each side are taken with respect to the cylindrical furnace as in FIG. 2, such an integral equation expressing equilibrium of mutual reflection is given by the following equations:

$$\Phi(x) = E(x) + r(x) \int_0^l K(x,\xi) \cdot \Phi(\xi) d\xi + r(x) \cdot \quad (1)$$

-continued $$\psi(y) = E(y) + r(y) \int_0^l K(y,\xi) \cdot \Phi(\xi)d\xi \quad (2)$$

$$\int_0^l K(x,y) \cdot \psi(Y)dy$$

wherein
- $\phi(x)$: radiant existence at point X,
- $\psi(y)$: radiant existence at point Y,
- $E(x), E(y)$: inherent radiant existences at points X and Y, respectively, and
- $K(x,\xi)$, $K(x,y)$, $K(y,\xi)$: each angle factor obtained from geometrical relationship of cavity and which can be expressed as follows:

$$K(x,\xi) = \frac{1}{2}\left[1 - \frac{|x-\xi|\{(x-\xi)^2 + 6\}}{\{(x-\xi)^2 + 4\}^{\frac{3}{2}}}\right]$$

$$K(x,y) = \frac{2xy(x^2 - y^2 + 1)}{\{(x^2 + Y^2 - 1)^2 + 4x^2\}^{\frac{3}{2}}}$$

$$K(y,\xi) = \frac{2\xi(\xi^2 - y^2 + 1)}{\{(x^2 + y^2 - 1)^2 + 4x^2\}^{\frac{3}{2}}}$$

When temperature distribution is substituted for $E(x)$ and $E(y)$ to solve equations (1) and (2) so that $\psi(o)$ is extracted, an effective emissivity in the central portion of the target can be obtained.

Since it is difficult to directly solve simultaneous integral equations (1) and (2), these equations are solved by means of numerical integration utilizing method of successive approximation.

One example of such calculation will be described hereinbelow.

Assuming that the effective cavity emissivity in the central portion of the target becomes unity in the case where a depth-to-radius ratio $l/r$ is 8 and where the radius of the aperture and length of the furnace are designated by r and l, respectively, and where the inherent radiation emissivity of the furnace material SiC is 0.75, if it is further assumed that the temperature distribution of the target is uniform and the temperature distribution from the target to the aperture is rectilinear these conditions are defined by the following equations:

$$\Delta T = 7.05\lambda T_o^2 \text{ (in case of single wavelength)} \quad (3)$$

$$\Delta T = 0.251 T_o \text{ (in case of total wavelength)} \quad (4)$$

where
- $\Delta T = T_a$ (temperature of the aperture) $- T_o$ (temperature of the target)
- $\lambda$: wavelength, Accordingly, equations (3) and (4) can be expressed as follows:

$$T_a = T_o + 7.05\lambda T_o^2 \quad (5)$$

$$T_a = 1.0251 T_o \quad (6)$$

More specifically, in such a type of cylindrical furnace, a temperature $T_a$ of the aperture may be made to be $T_o + 7.05 T_o^2$ (the temperature of target and coefficient-fold of the square thereof $T_o^2$) with respect to the temperature $T_o$ of the target as expressed by equation (5) in the case of single wavelength, while the temperature $T_a$ of aperture may be made to have a relationship of linear equation with respect to the temperature $T_o$ of target as given in equation (6) in the case where total wavelength is utilized.

Furthermore, with respect to temperature distribution from the target to the aperture, when halfway of the length l of furnace from the target to the aperture is rectilinear, an error of effective cavity emissivity is 0.0005 or less, so that there is no practical problem.

FIG. 3 is a block diagram showing one example of the arithmetic unit 30 of FIG. 2 and which is provided for effecting operation upon equation (5) in the single wavelength situator. In this case, the temperature $T_o$ of target is supplied to an adder A and at the same time, multiplied by itself to obtain a value $T_o^2$ in a multiplier M, then the value is increased by coefficient $\alpha$ times by means of a variable resistor R to obtain a value $\alpha T_o^2$, and the resulting value is supplied to the adder A, so that output of the adder A becomes $T_o + \alpha T_o^2$.

As is understood from equation (5), the coefficient $\alpha$ depends on wavelength $\lambda$, and accordingly it is desirable that the variable resistance R can be adjusted from outside the furnace.

As described above, when the temperature of the aperture in a blackbody furnace is arranged to be a prescribed temperature with respect to the temperature of the target by means of a control part, a blackbody having an effective cavity emissivity of unity can be established. Furthermore such control part may be replaced by a control arithmetic unit effecting function generation control by utilizing a microcomputer. If desired, the arithmetic unit may also be substituted by a function generator in which mechanical means are employed.

In addition, in order to effect the operation of equation (6) in respect of total wavelength, a coefficient multiplier comprising one operational amplifier and the like may be used.

FIG. 4 is a side explanatory view showing another embodiment of the present invention and FIG. 5 is an explanatory view clearly illustrating a zone division of the spherical blackbody furnace according to the present invention. In FIGS. 4 and 5, reference numeral 41 designates a spherical furnace made from silicon carbide or the like provided with an aperture or opening 41a at an end along its horizontal direction and the interior of the furnace being hollow (cavity). This embodiment further includes a hexahedral heating unit 42 containing the spherical furnace 41 by holding the same with upper and lower cylindrical members 43 each of them possessing holes on the sides thereof, a standard thermometer 44 for measuring a temperature of the target of the spherical furnace 41, a thermometer 51 for measuring a temperature in side a of the surface having the aperture 41a, a thermometer 52 for measuring a temperature in side c of the target surface, and a thermometer 53 for measuring a temperature in side $b_1$ of a side surface, respectively. In such arrangement, the heating unit 42 is divided into three zones, i.e., side a of the aperture surface, side c of the target surface, and sides $b_1$, $b_2$, $b_3$, $b_4$ of the side surfaces, respectively.

More specifically, temperatures in three divided zones (a), (c) and ($b_1$–$b_4$) of the heating unit 42 are detected by means of thermometers 51, 52 and 53, respectively, the temperature in the target surface c being controlled so as to become a prescribed temperature, and then, the respective temperatures in the aperture surface a and side surfaces $b_1$–$b_4$ are controlled by means of a controller (not shown) in such manner that these respective temperatures are permitted to coincide with the temperature in the target surface c controlled as described above. Thus, the spherical furnace 41 causes cavity radiation with respect to the heating unit 42 to be isothermic, so that the interior of the spherical furnace 41 becomes at ideal blackbody conditions. Under these conditions, when a radiation thermometer is to be calibrated at the aperture 41a, the calibration becomes possible on the basis of temperature of the standard thermometer 44.

Actual measurements of a conventional embodiment described in Japanese Patent Application No. 62973/80 and that of the present invention will be set out in the following Table 1.

TABLE 1

|  | Temperature Difference between target and aperture | Effective Cavity Emissivity |
| --- | --- | --- |
| Conventional Embodiment | 20–50K | 0.960–0.990 |
| Embodiment of This Invention | 0–5K | 0.995–0.999 |

As is apparent from Table 1, the temperature difference between the target and aperture has effectively been reduced to about 1/10, besides the effective cavity emissivity has also been improved in the present invention.

In the second embodiment as described above, however, if the operating temperature is low, there arises a tendency for the temperature on the lower side $b_3$ of the side surface in the heating unit 42 to decrease particularly due to convection, conduction of heat or the like. In the case, as stated above, a third embodiment is provided wherein the heating unit 42 is divided into three zones such as zones (a, $b_3$), (c) and ($b_1$, $b_2$, $b_4$) by causing the lower side $b_3$ of the side surfaces to be involved in the aperture surface a, and the zones thus divided are subjected to three-zone control, whereby the temperature difference in the vertical direction of the spherical furnace 41 can be reduced and may be arranged.

Actual measurements with reference to temperature difference of the spherical surface 41 along its vertical direction are shown in the following Table 2 in respect of the latter third embodiment and the former second embodiment, respectively.

TABLE 2

|  | Temperature Difference (300° C.) | Temperature Difference (500° C.) |
| --- | --- | --- |
| The 2nd Embodiment | 5K | 3K |
| The 3rd Embodiment | 0.5K | 0.5K |

As is clearly understood from Table 2, the temperature difference has been reduced to about 1/10 in the third embodiment as compared with that of the second embodiment. Furthermore the same advantageous effects can also be obtained by utilizing surface heaters made from Kanthal heating member, or rod-like members 46 made of silicon carbide or the like as shown in FIG. 6 other than usual heaters as the hexahedral heating unit 42.

For reference, dimensions of the spherical blackbody furnace are about 200 mm spherical furnace diameter, 50 mm aperture diameter, and 400 mm each of sides of the heating unit.

Moreover, as shown in FIG. 7, a modification may be made such that two heating members 42a and 42b are disposed on the aperture and target sides of the spherical furnace 41, respectively, to divide the furnace into two zones, thereby to prevent temperature drop of the aperture 41a. In addition, the invention may be further modified in such a way that the spherical furnace 41 is divided into two zones, and these zones are surrounded by rod-like members. Besides, in the emobdiments shown in FIGS. 4 and 5, each surface of the aperture, target and side surfaces may be divided into two zones, respectively.

As mentioned above, the present invention relates to a blackbody furnace in which heaters are controlled in such manner that the temperature of the aperture portion of the blackbody furnace has a prescribed relationship with respect to the temperature of the target of the furnace.

In such a blackbody furnace, it is possible that its effective cavity emissivity $\epsilon e(\lambda)$ is always unity, even if there is an aperture, or even if measured temperature and wavelength vary, and as a consequence a precise practical blackbody furnace can be realized. Particularly, calibration with a very high precision becomes possible in the case where such calibration is effected by sighting a radiation thermometer at the target of the blackbody furnace.

What is claimed is:

1. A blackbody furnace which comprises a main heater disposed adjacent a target portion of said blackbody furnace, at least one auxiliary heater disposed on at least one aperture of said blackbody furnace, and a control part for controlling said main heater and said at least one auxilliary heater in such manner that the temperature of said aperture of said blackbody furnace maintains a prescribed relationship with respect to the temperature of said target portion thereof, and further wherein said control part is a control part for controlling said at least one auxiliary heater in such a manner that the temperature of said aperture is the sum of the temperature of said target portion and the square of the temperature of said target portion in a cylindrical blackbody furnace when a single wave length is utilized.

2. A blackbody furnace as defined in claim 1 wherein said control part may also control said at least one auxiliary heater in such a manner that the temperature of said at least one aperture has a linear proportional relationship with respect to the temperature of said target portion in a cylindrical blackbody furnace area when a total wavelength is utilized.

3. A blackbody furnace as defined in claim 1 wherein a coefficient related to said square of the temperature of said target portion can be adjustably established outside said blackbody furnace.

* * * * *